Dec. 5, 1939.   R. H. POLK   2,182,764
VEHICLE STEERING WHEEL SWITCH
Filed July 21, 1938   2 Sheets-Sheet 1
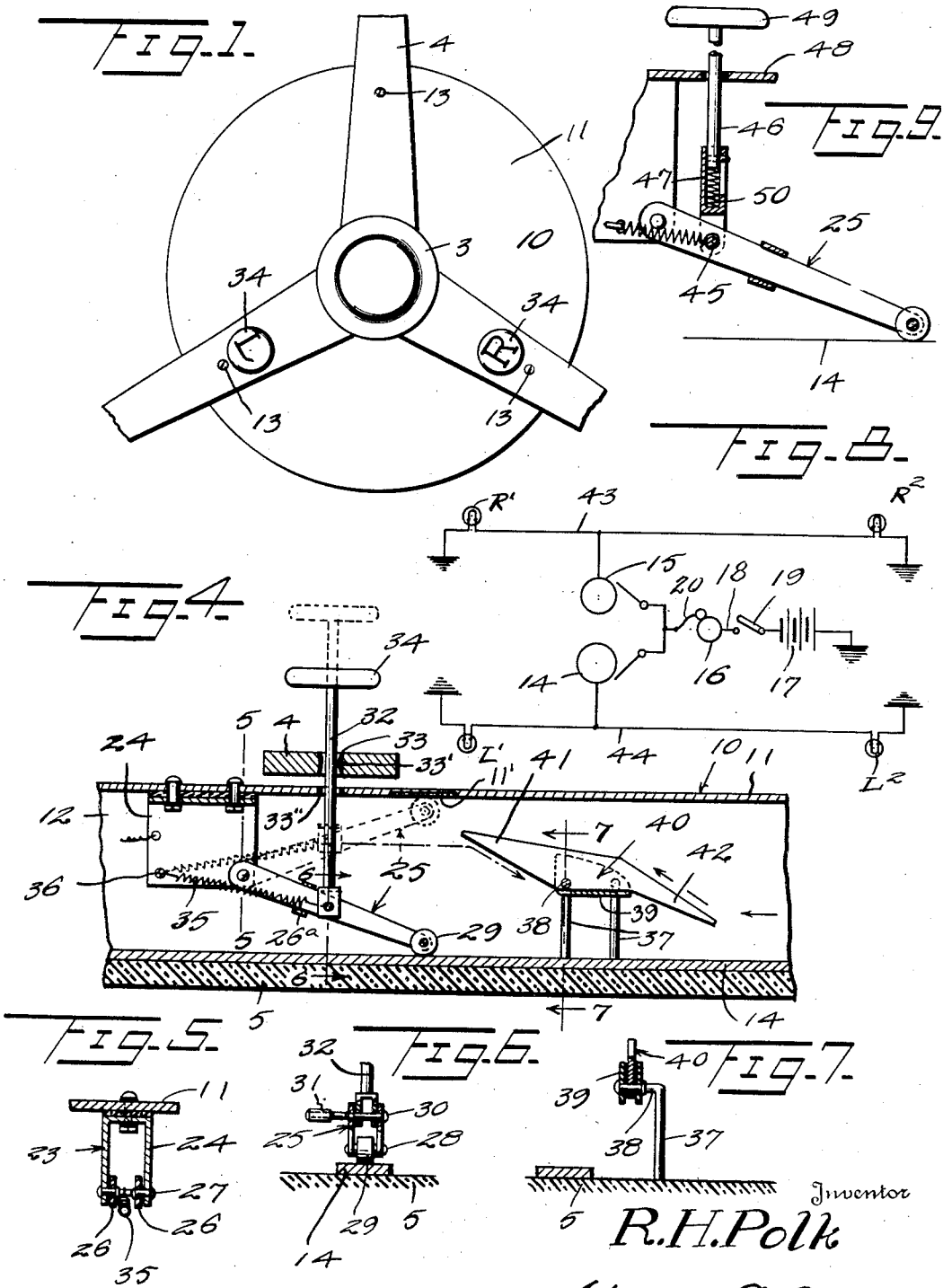
Inventor
R.H.Polk
By Watson E. Coleman
Attorney

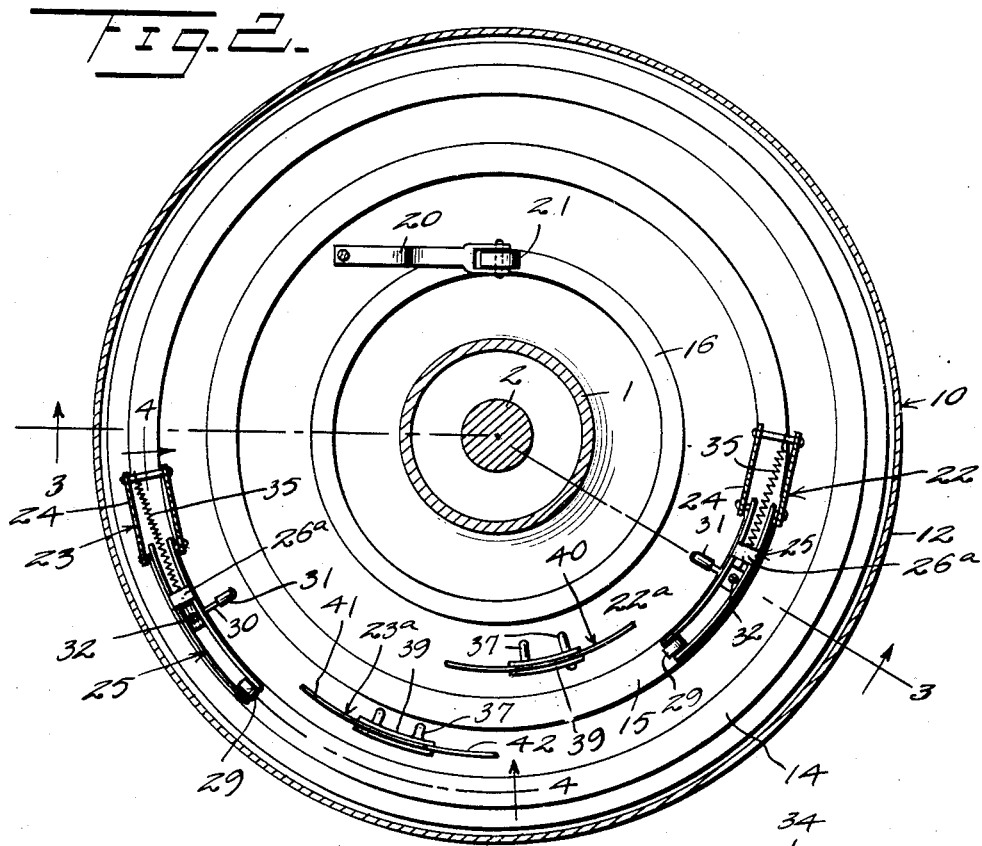

Patented Dec. 5, 1939

2,182,764

UNITED STATES PATENT OFFICE 2,182,764

VEHICLE STEERING WHEEL SWITCH

Robert Henry Polk, Hapeville, Ga.; Robert Eugene Polk, executor of said Robert Henry Polk, deceased Application July 21, 1938, Serial No. 220,587

8 Claims. (Cl. 200—59)

This invention relates to improvements in vehicle signals and pertains particularly to improved signal mechanism for a motor vehicle and constitutes an improvement upon my prior Patent No. 2,119,286.

The present invention has for its primary object to provide a signal mechanism for motor vehicles of all types or other vehicles requiring the use of such signals to indicate turns, which is completely automatic in its operation in that it will set itself at the beginning of the making of a turn by the vehicle and will be automatically restored to inoperative condition when the vehicle is again traveling along a straight path.

Another object of the invention is to provide in a vehicle signaling device designed to operate automatically as above stated, a signaling device which may be manually set in advance of the making of the turn and which will automatically be restored to inoperative position when the operator of the vehicle brings the latter back to a straight path of travel.

Still another object of the invention is to provide in a signal mechanism of the above described character, a novel form of tripping device for throwing a switching arm into operative position or out of operative position as may be required.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in top plan of a portion of a motor vehicle steering wheel showing the manner in which the device is attached to the spokes or spider of the wheel.

Fig. 2 is a view in horizontal section through the signal controlling mechanism.

Fig. 3 is a sectional view taken substantially upon the line 3—3 of Fig. 2.

Fig. 4 is a sectional view taken substantially upon the line 4—4 of Fig. 2.

Fig. 5 is a sectional view on the line 5—5 of Fig. 4.

Fig. 6 is a sectional view on the line 6—6 of Fig. 4.

Fig. 7 is a sectional view on the line 7—7 of Fig. 4.

Fig. 8 is a view illustrating the circuit diagram for the signalling mechanism.

Fig. 9 shows a slightly modified form of the push button for actuating the circuit closing units.

Referring now more particularly to the drawings, the numeral 1 generally designates the tube of a steering wheel through which the usual shaft 2 passes for connection with the steering wheel, a portion only of which is shown, which portion of the wheel consists of the center or hub part 3 and the spokes or spider 4 which extend from the hub to the wheel proper (not shown).

In carrying out the present invention, there is provided an insulation disk or head 5 having a central opening 6 through which the tube 1 of the steering post passes and secured to this disk is a split collar 7 which encloses the tube 1 and has the abutting ears 8 which are drawn together by bolts 9 to clamp it securely to the steering post.

Secured to the under side of the steering spider of the vehicle steering wheel is a circular housing 10 which has the top wall 11 and the depending side wall 12, the lower edge of which extends across and is spaced from the periphery of the disk 5 while the top wall 11 is secured to the spokes of the wheel or of the spider by bolts 13 or other suitable securing members.

Secured in concentric relation with the steering post and upon the top of the insulation disk 5 are the three metallic rings 14, 15 and 16. The ring 16 constitutes an electric current transfer means between the battery 17 of the motor vehicle or any other suitable source of electric potential, and the hereinafter described switch arms by means of which current is carried from the car battery to the selected signal lamps on the vehicle. The current conductor 18 which is connected with the ring 16 leads to the battery 17 through a suitable hand switch 19 which may be conveniently placed within the vehicle so that the flow of current from the battery to the several signal lights may be interrupted by hand in the event of any failure of the device to operate properly.

Within the casing 10 is a current pick-up unit comprising an arm 20 which is secured to and insulated from the top wall 11 of the housing, as shown in Fig. 3, and the wheel 21 which engages the top of the ring 16. The arm 20 may be of spring metal and so flexed that it will constantly force the roller 21 downwardly and firmly against the current supply ring 16.

At opposite sides of a center line passing through the steering post and extending longitudinally of the vehicle there are located within the casing 10 the circuit closing units 22 and 23 for the right and left turn signals, respectively, which are carried by the vehicle preferably at the front and the rear thereof. Such signal units are shown in the circuit diagram in Fig. 8 and are designated R¹ and R² for the front and rear right turn signals and L¹ and L² for the front and rear left turn signals. Each of the units 22 and 23 is of exactly the same construction, therefore, the same numerals will be used upon both units for referring to the specific parts thereof and reference to Fig. 4 will show that each circuit closing unit comprises a bracket 24 which is secured to the underside of and insulated from the top wall 11 of the casing 10. While this bracket may be of any suitable construction, it is here shown as being in the form of an inverted U-frame so that it is open at its lower part to permit free movement of the hereafter described elements which it carries. Pivotally attached to each bracket 24 is a snap action switching arm indicated generally by the numeral 25 and consisting of two parallel bars 26 which are pivotally secured at one end, as at 27, Fig. 5, within the lower part of the bracket and have their other ends connected by a pin 28 which carries a roller 29 between the ends of the bars, as shown in Fig. 6. These parallel bars are rigidly held together by means of the two cross or tie bars 26a. Intermediate its end each switching arm has a cross pin 30 extending between the bars 26, which pin extends a substantial distance radially of the housing upon the inner side of the arm and carries a trip roller 31. Between the bars 26 the pin 30 has joined thereto the lower end of a vertically disposed push pin 32 which extends upwardly through a suitable opening in the top wall 11 in the casing and through a guide opening 33 in a spoke 4 of the steering wheel and terminates at its upper end in the button 34. The push pins 32 may be of hard rubber or other suitable non-conducting substance or, if made of metal, the apertures in the top of the casing and the spider arms 4 may have suitable insulation sleeves secured therein as indicated at 33' and 33'' so that the parts will not be grounded to the casing or wheel spider.

A spring 35 is connected between the pin 30 of each of the arms 25 and an anchor pin 36 carried by the adjacent bracket in a location upon the opposite side of the pivots 27 from the pin 30 so that as will be readily apparent upon reference to Fig. 4, when a push pin 32 is forced downwardly, the spring 35 in passing the pivotal center for the arm 25 will operate to hold the arm down so that the roller 29 carried at the free end of the arm will maintain electrical contact with an underlying one of the two outer rings, the switching unit 23 here being shown positioned to have its contact roller 29 engage the outer ring 14 while the other unit 22 is arranged to have its contact roller 29 engage the center ring 15. As previously stated, the signal circuit closing devices 22 and 23 are disposed upon opposite sides of a center line passing longitudinally of the vehicle through the steering post when the vehicle is traveling in a straight path. Adjacent to and disposed upon opposite sides of this center line and between the units 22 and 23, when the latter are in the positions which they occupy when the vehicle is traveling along a straight path, are two tripping units which are supported by the insulation disk 5 and which operate in association with the circuit closing units 22 and 23 and are, therefore, generally designated respectively 22a and 23a. Each of these tripping units is disposed on a circular path at the inner side of the circuit closing unit with which it is associated and each tripping unit consists of two supporting posts 37 which at their upper ends are turned to extend radially outwardly as indicated at 38, Fig. 7. Supported between the out-turned ends of each pair of posts 37 is an upwardly opening saddle 39 and the outwardly turned end 38 of that post which is nearest the circuit closing unit with which the tripping device is associated constitutes a pivot for an oscillatable trip bar 40. This trip bar is in the form of an elongated flat plate having the intermediate portion thereof disposed in the adjacent saddle 39 and having the pivot pin for the laterally extended one of the turned portions 38 of a supporting post, passing therethrough. The ends of the trip bar 40 are tapered off to form pointed horns 41 and 42, the horn 41 being directed obliquely upwardly and having its point terminating in a plane above the trip roller 31 of the adjacent circuit closing unit when that unit is in raised inoperative position, while the point of the horn 42 extends downwardly to a plane below that plane occupied by the tripping roller 31 of the adjacent circuit closing unit when the unit is in down or circuit closed position.

From the foregoing description taken in association with the drawings illustrating the invention, the operation of the mechanism will be understood to be as follows:

Assuming that the driver of the vehicle in which the mechanism is installed is approaching an intersection where he wishes to make a right turn, he may, if he desires to set the signal indicating the turn before he actually begins to make it, depress the right turn button so as to force the arm 25 of the circuit closing unit 22 down to a point where the spring 35 will pass the supporting pivots 27 for that arm whereupon the spring will take control of the arm to pull it down into firm electrical contact with the underlying current pick-up ring 15. The electric current will then flow from the battery through the current supply ring 16 and the conducting arm 20 which connects the roller 21 with that ring and pass through suitable conducting wires 43 to and through the lamps R¹ and R² constituting the front and rear right turn signals where it will be grounded to return by the ground connection to the battery. Since arm 25 of the right turn signal controlling unit 22 is down when the right turn is made, it will be seen that the trip roller 31 will merely pass under the downwardly directed horn 42 of the adjacent trip bar 40 when the turn is made but when the steering wheel is brought back to normal position, the roller 31 will ride over the top of the horn 42 of the adjacent trip bar and raise the arm 25 to a height where the control spring 35 will pass the pivot center for the arm and the spring will then take control of the arm to snap it up into inoperative position. Likewise manipulation of the left turn button will produce the same results, the current passing from the ring 16 through the insulated conductors 44 to the front and rear left turn signals.

If the operator of the vehicle does not manually depress either button before making a turn, it will be readily seen that when the turn is made, one of the circuit closing units 22—23 will have the trip roller 31 thereof forced to ride against the under edge of the horn 41 of the adjacent trip bar 40 and since the bar 40 cannot oscillate in a direction to raise the horn 41, the arm 25 of the switching unit will be forced down into circuit closing position as previously described, and when the steering wheel is restored to normal straight ahead driving position, the trip roller 31 will ride up over the top edge of the downwardly directed horn of the adjacent trip bar and return the arm to circuit open or signal off position.

While in the present illustration and description of the drawings, the push pins have been illustrated as passing through the spokes of the steering wheel so that the buttons 34 thereof are constantly above the spokes, it will be obvious that the pins may be passed through the top wall 11 of the casing 10 at one side of the spokes so that the buttons carried thereby will not project above the spokes and thus form a possible means of interfering with the smooth operation of the steering wheel.

In the modified form of the invention shown in Fig. 9, a push button structure is disclosed which, when used in association with an arm 25 of a circuit closing unit, reduces the extent of movement necessary to be made by the push button in order to effect the depression of the circuit closing arm. In this form of the invention, the pivotal connecting point between the stem of the push button is moved nearer to the point of oscillation for the arm 25, as indicated at 45, and the stem of the push button which is generally designated by the numeral 46, consists of a lower tubular portion 47 which is pivotally coupled with the pivot 45 and an upper solid portion 48 which passes through the top of the casing 10 and carries the button 49. Within the tubular portion 47 of the stem is a spring 50 against which the lower end of the solid portion of the stem bears. This spring normally tends to force the upper or solid portion of the stem upwardly and thus it will be seen that by forcing the button 49 downwardly by a sharp blow, the spring 50 will be compressed and will, upon reacting, snap the arm 25 down into circuit closing position.

In order that the mechanism will not be grounded when the rollers 29 are in raised position, the underside of the top wall 11 of the casing 10 has secured thereto in position for contact by each roller 29 when the arms 25 are raised, an insulation body 11'. As shown in Fig. 4, when the circuit control arm 25 is raised, the wheel 29 will bear against this insulation sheet or body and will prevent current from flowing into the casing to be returned to the battery by way of the ground connection.

While there has been shown and described a roller 31 carried by each of the pins 30, it will be recognized that this construction has been made use of primarily for the purpose of increasing the ease of action of the mechanism, as the device will operate efficiently if the roller is dispensed with so that the pin 30 will directly engage the upper and lower edges of the trip bar 40 in the operation of the signal.

What is claimed is:

1. A motor vehicle steering wheel switch for interposition between a source of electric potential and an electric indicator, comprising a stationary body disposed around the post of the steering wheel, a cover for said body carried by the steering wheel for rotation therewith relative to the stationary body, a current conducting unbroken annulus carried by the stationary body in concentric relation with the steering wheel post and forming one side of the switch, a spring actuated switch arm supported at one end by the cover and adapted to have its other end vertically swung to have an off and an on position and when in said on position having said end engaging said annulus, and means carried by the stationary body adjacent said arm and adapted to move said arm into on position upon rotation of the arm with the cover in one direction and to move the arm into off position upon rotation of the arm and cover in the opposite direction.

2. A motor vehicle steering wheel switch for interposition between a source of electric potential and an electric indicator, comprising a stationary body disposed around the post of the steering wheel, a cover for said body carried by the steering wheel for rotation therewith relative to the stationary body, a current conducting annulus carried by the stationary body in concentric relation with the steering wheel post and forming one side of the switch, a spring actuated switch arm supported by the cover and adapted to have an off and an on position and when in said on position engaging said annulus, and means carried by the stationary body adjacent said arm and adapted to move said arm into on position upon rotation of the arm with the cover in one direction and to move the arm into off position upon rotation of the arm and cover in the opposite direction, said means constituting an elongated member extending in a line paralleling the line of movement of said arm and having oppositely directed upwardly and downwardly extending end portions, one of said end portions engaging the arm to move it into said on position and the other portion engaging the arm to move it into the said off position.

3. A switch mechanism adapted to be supported upon a vehicle steering wheel and interposed between a source of electric potential and an electrically operated indicator, comprising a stationary disk body supported beneath said steering wheel in concentric relation therewith, a cover for said body carried by the steering wheel, an electric current conducting annulus carried by said body beneath the cover and concentric with the wheel, an electric circuit controlling switch arm pivotally supported from the cover and adapted to oscillate vertically, spring means connected with said arm to maintain the same in raised off position and in lowered on position, said arm when in on position contacting said strip, a trip roller carried by said arm at one side, and means supported by said disk in a path parallel with the path of travel of the arm and in the line of travel of said trip roller for engaging over the top of the roller when the arm and disk are moved toward the said means to throw the arm to on position and for engaging beneath the trip roller when the arm is moved in the opposite direction to shift the arm into off position.

4. A switch mechanism adapted to be supported upon a vehicle steering wheel and interposed between a source of electric potential and an electrically operated indicator, comprising a stationary disk body supported beneath said steering wheel in concentric relation therewith, a cover for said body carried by the steering wheel, an electric current conducting annulus carried by said body beneath the cover and concentric with the wheel, an electric circuit controlling switch arm pivotally supported from the cover and adapted to oscillate vertically, spring means connected with said arm to maintain the same in raised off position and in lowered on position, said arm when in on position contacting said strip, a trip roller carried by said arm at one side, and means supported by said disk in a path parallel with the path of travel of the arm and in the line of travel of said trip roller for engaging over the top of the roller when the arm and disk are moved toward the said means to throw the arm to on position and for engaging beneath the trip roller when the arm is moved in the opposite direction to shift the arm into off position, said last means comprising an elongated bar member having a pivotal support permitting its vertical oscillation and said bar having one end directed obliquely upwardly and the other end directed obliquely downwardly, the said trip roller passing beneath the downwardly directed end and oscillating the bar when said arm is moved in the first-mentioned direction.

5. A switch mechanism adapted to be supported upon a vehicle steering wheel and interposed between a source of electric potential and an electrically operated indicator, comprising a stationary disk body supported beneath said steering wheel in concentric relation therewith, a cover for said body carried by the steering wheel, an electric current conducting annulus carried by said body beneath the cover and concentric with the wheel, an electric circuit controlling switch arm pivotally supported from the cover and adapted to oscillate vertically, spring means connected with said arm to maintain the same in raised off position and in lowered on position, said arm when in on position contacting said strip, a trip roller carried by said arm at one side, means supported by said disk in a path parallel with the path of travel of the arm and in the line of travel of said trip roller for engaging over the top of the roller when the arm and disk are moved toward the said means to throw the arm to on position and for engaging beneath the trip roller when the arm is moved in the opposite direction to shift the arm into off position, and vertically reciprocatable means connected with said arm facilitating the manual vertical oscillation thereof.

6. A switch mechanism adapted to be supported upon a vehicle steering wheel and interposed between a source of electric potential and an electrically operated indicator, comprising a stationary disk body supported beneath said steering wheel in concentric relation therewith, a cover for said body carried by the steering wheel, an electric current conducting annulus carried by said body beneath the cover and concentric with the wheel, an electric circuit controlling switch arm pivotally supported from the cover and adapted to oscillate vertically, spring means connected with said arm to maintain the same in raised off position and in lowered on position, said arm when in on position contacting said strip, a trip roller carried by said arm at one side, means supported by said disk in a path parallel with the path of travel of the arm and in the line of travel of said trip roller for engaging over the top of the roller when the arm and disk are moved toward the said means to throw the arm to on position and for engaging beneath the trip roller when the arm is moved in the opposite direction to shift the arm into off position, and vertically reciprocatable means connected with said arm facilitating the manual vertical oscillation thereof, said last means comprising a stem having a tubular portion and a solid portion with said solid portion slidably extending into the tubular portion and having limited movement therein and an expansible spring in the tubular portion against which said solid portion bears.

7. A signaling mechanism for a motor vehicle adapted to be supported by and operated simultaneously with the movement of the vehicle steering wheel, comprising a disk body of insulation supported beneath the steering wheel concentrically with the same, said disk body being stationary with respect to the wheel, a current distributing annulus supported upon the top of said disk concentrically with the wheel, a pair of annuli supported upon the top of the disk concentrically with the first annulus, means for conducting electric current to said first annulus, a current take-up device supported from and movable with the wheel and electrically engaging said first annulus, said first annulus being designed for connection with one side of a source of electric potential, the said pair of annuli being each adapted for connection with one side of a signal element having its other side electrically connected with said source of potential, a pair of vertically movable circuit closing units connected with said wheel for rotary movement therewith and each unit including a vertically oscillatable switch arm adapted when in one position to electrically engage one of said pair of annuli, electrical connecting means between said arms and said current pick-up means, and means carried by said disk adjacent each of said arms which is so constructed and arranged that upon movement of said wheel in either a clockwise or counterclockwise direction an arm will be brought into electrical connection with the annulus adjacent thereto to close an electric circuit including an indicator and upon movement of said wheel in the opposite direction the said arm will be moved out of electrical engagement with the adjacent annulus to open said electric circuit.

8. A motor vehicle steering wheel switch for interposition between a source of electric potential and an electric indicator, comprising a stationary body disposed around the post of the steering wheel, a movable body carried by the steering wheel to turn therewith and overlying the stationary body, a current conducting annulus carried by the stationary body concentrically with said post and forming one side of a switch, a spring actuated switch arm supported at one end by the movable body and adapted for vertical swinging movement from an on position in which the other end thereof is in contact with the annulus, to an off position in which the said other end is swung up toward the movable body, and means supported upon the fixed body at one side of the path of movement of the arm, when the latter is moved by the turning of the wheel, which is adapted to swing the arm to on position upon rotation of the wheel in one direction and swing the arm to off position upon rotation of the wheel in the opposite direction.

ROBERT HENRY POLK.